US009489050B2

(12) United States Patent
Hua

(10) Patent No.: US 9,489,050 B2
(45) Date of Patent: Nov. 8, 2016

(54) METHOD AND USER EQUIPMENT FOR UNLOCKING SCREEN SAVER

(71) Applicant: Huawei Technologies Co., Ltd., Shenzhen, Guangdong (CN)

(72) Inventor: Li Hua, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 574 days.

(21) Appl. No.: 13/850,006

(22) Filed: Mar. 25, 2013

(65) Prior Publication Data

US 2013/0283165 A1    Oct. 24, 2013

Related U.S. Application Data

(63) Continuation of application No. PCT/CN2012/084309, filed on Nov. 8, 2012.

(30) Foreign Application Priority Data

Mar. 26, 2012    (CN) .......................... 2012 1 0082275

(51) Int. Cl.
*G06F 3/16* (2006.01)
*G06F 3/01* (2006.01)
(Continued)

(52) U.S. Cl.
CPC ........... *G06F 3/017* (2013.01); *G06F 3/04883* (2013.01); *G06F 3/167* (2013.01); *G06F 21/36* (2013.01)

(58) Field of Classification Search
CPC ............... G06F 3/0481; G06F 3/0488; G06F 3/04883; G06F 3/017; G06F 3/167; G06F 21/36
See application file for complete search history.

(56) References Cited

U.S. PATENT DOCUMENTS 5,559,961 A * 9/1996 Blonder .......................... 726/18
6,862,687 B1 * 3/2005 Suzuki ............................ 726/18
(Continued)

FOREIGN PATENT DOCUMENTS

CN    101634925 A *    1/2010
CN    102141880 A      8/2011
(Continued)

OTHER PUBLICATIONS

"Eleven Ways to Replace Your Lock Screen," Jun. 26, 2011, http://android.appstorm.net/roundups/utilities-roundups/eleven-ways-to-replace-your-lock-screen/, 16 pages.*
(Continued)

*Primary Examiner* — Kieu Vu
*Assistant Examiner* — Asteway T Gattew

(57) ABSTRACT

Embodiments of the present invention provide a method and user equipment for unlocking a screen saver, which can implement personalized operations of screen saver unlocking. The method includes: detecting a position of a first input on a screen; detecting a duration of the first input when the position of the first input falls into a user-preset track; and unlocking the screen saver when the duration exceeds a time threshold. The corresponding user equipment includes a position detecting module, a time detecting module, and a screen. The above technical solutions may implement personalized operations of screen saver unlocking and increase fun by detecting whether the position of a user input falls into a user-preset track and detecting the duration of the user input.

15 Claims, 7 Drawing Sheets

(51) Int. Cl.
*G06F 3/0488* (2013.01)
*G06F 21/36* (2013.01)

(56) References Cited

U.S. PATENT DOCUMENTS

| | | | | |
|---|---|---|---|---|
| 7,453,443 | B2 * | 11/2008 | Rytivaara et al. | 345/173 |
| 7,593,000 | B1 * | 9/2009 | Chin | 345/156 |
| 7,657,849 | B2 * | 2/2010 | Chaudhri et al. | 715/863 |
| 8,363,008 | B2 * | 1/2013 | Ryu et al. | 345/156 |
| 8,924,893 | B2 * | 12/2014 | Swink et al. | 715/863 |
| 2004/0085351 | A1 * | 5/2004 | Tokkonen | 345/741 |
| 2010/0321304 | A1 * | 12/2010 | Rofougaran | G06F 3/046 345/173 |

FOREIGN PATENT DOCUMENTS

| | | | |
|---|---|---|---|
| CN | 102236527 A | | 11/2011 |
| CN | 102314290 A | * | 1/2012 |
| CN | 102662571 A | | 9/2012 |

OTHER PUBLICATIONS

International Search Report dated Feb. 21, 2013 in connection with International Patent Application No. PCT/CN2012/084309.
Written Opinion of the International Searching Authority dated Feb. 21, 2013 in connection with International Patent Application No. PCT/CN2012/084309.

* cited by examiner

METHOD AND USER EQUIPMENT FOR UNLOCKING SCREEN SAVER

CROSS-REFERENCE TO RELATED APPLICATIONS

This application is a continuation of International Application No. PCT/CN2012/084309, filed on Nov. 8, 2012, which claims priority to Chinese Patent Application No. 201210082275.5, filed on Mar. 26, 2012, both of which are hereby incorporated by reference in their entireties.

TECHNICAL FIELD

The present invention relates to the field of terminal applications, and in particular, to a method and a user equipment for unlocking a screen saver.

BACKGROUND

Various user equipments emerge with the development of technologies. Various user equipments increasingly present personalities not only in appearances but also in application fields. Users expect more fun in personalized applications.

To avoid misoperation or save power, a screen saver is usually set for user equipments. A user equipment can perform subsequent operations only after its screen saver is unlocked. Currently, the operation to unlock the screen saver of a user equipment is monotonous and therefore does not allow personalized applications.

SUMMARY

Embodiments of the present invention provide a method and a user equipment for unlocking a screen saver, which can implement personalized operations of screen saver unlocking.

In one aspect, a method for unlocking a screen saver is provided, including: detecting a position of a first input on a screen; detecting a duration of the first input when the position of the first input falls into a user-preset track; and unlocking the screen saver when the duration exceeds a time threshold.

In another aspect, a user equipment is provided, including a position detecting module, a time detecting module, a screen saver module, and a screen, where: the position detecting module is configured to detect a position of a first input on the screen; the time detecting module is configured to detect a duration of the first input when the position detecting module detects that the position of the first input falls into a user-preset track; and the screen saver module is configured to unlock a screen saver when the time detecting module detects that the duration exceeds a time threshold.

The above technical solutions may implement personalized operations of screen saver unlocking and increase fun by detecting whether the position of a user input falls into a user-preset track and detecting the duration of the user input.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

A user equipment may include, for example, a desktop computer, a mobile terminal, a tablet computer (PAD), and an all-in-one computer. PAD is the acronym of Painting, Album, and Diary. An all-in-one computer is a terminal device that integrates a monitor and a host.

Taking a desktop computer as an example, to unlock a screen saver, it is necessary to move a mouse to display an operable interface. Taking a mobile phone as an example, to display an operable interface, a menu prompting screen saver unlocking needs to first pop up and then the selection input of screen saver unlocking is accepted. In the above exemplary cases, the operation is the same to every user and the personalized difference of a user cannot be reflected. In a social network where personalities are highlighted, a method for unlocking a screen saver and capable of conveying user personalities and increasing fun is needed. The embodiments of the present invention provide a method and a user equipment to resolve the issue.

Figure 1:
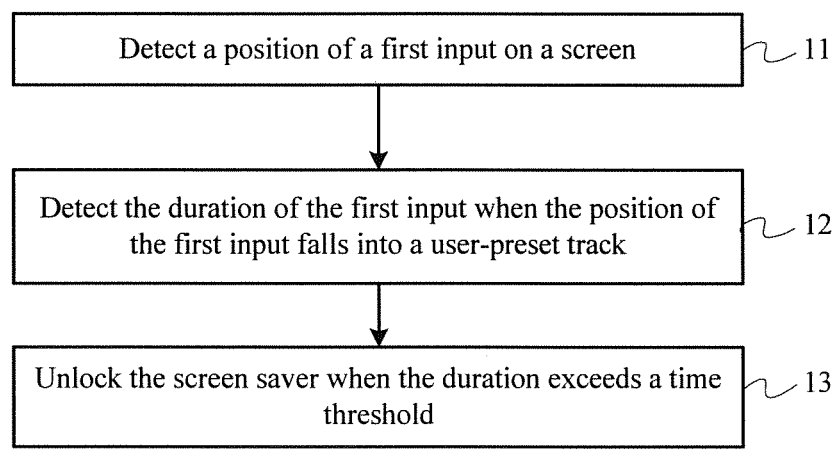
FIG. 1 is a schematic flowchart of a method for unlocking a screen saver according to an embodiment of the present invention.

FIG. 1 is a schematic flowchart of a method 10 for unlocking a screen saver in an embodiment of the present invention. The method 10 including the following content:

11. Detect the position of a first input on a screen.

12. Detect the duration of the first input when the position of the first input falls into a user-preset track.

13. Unlock the screen saver when the duration exceeds a time threshold.

The embodiment of the present invention may implement personalized operations of screen saver unlocking and increase fun by detecting whether the position of a user input falls into a user-preset track and detecting the duration of the user input.

Alternatively, unlocking the screen saver when the duration exceeds the time threshold includes: when the duration exceeds the time threshold, presenting the user-preset track, which gradually fades out, in the lock screen image of the screen saver until the screen saver is unlocked.

Alternatively, before detecting the position of a first input on the screen, the method further includes: detecting a second input on the screen, where the second input is used to input a movement track that is the user-preset track; presenting the user-preset track; and saving the user-preset track as a key for unlocking the screen saver.

Alternatively, before detecting a second input on the screen, the method further includes: detecting a third input which is used to select a background image; and presenting the selected background image; and presenting the user-preset track and saving the user-preset track as a key for unlocking the screen saver include: when the second input is being performed, accordingly presenting the changing background image that includes the user-preset track, saving the user-preset track as the key for unlocking the screen saver, and saving the background image that includes the user-preset track as the lock screen image of the screen saver.

Alternatively, presenting the background image that includes the user-preset track includes: presenting the background image that includes the user-preset track, and a save button and a cancel button, where the save button is used to save the background image that includes the user-preset track as the lock screen image of the screen saver and the cancel button is used to restore the interface that is presented before the third input; and saving the background image that includes the user-preset track as the lock screen image of the screen saver includes: detecting a fourth input which is used to select the save button, and saving, according to the fourth input, the background image that includes the user-preset track as the lock screen image of the screen saver.

Alternatively, when presenting the user-preset track, the method further includes: feeding back a sound.

Alternatively, presenting the background image that includes the user-preset track includes: presenting, according to different background images, the background image that includes the user-preset track and has different processing effects, where the background image includes multiple display elements that simulate the accumulative effects of fine grains in a real world, and the accumulative effects of fine grains include a sand box effect, a snow field effect, or a mist effect, so as to improve user experience.

Alternatively, after saving the background image that includes the user-preset track as the lock screen image of the screen saver, the method further includes: after the screen saver is enabled, when the lock screen image is presented, presenting or not presenting the user-preset track in the lock screen image.

Figure 2:
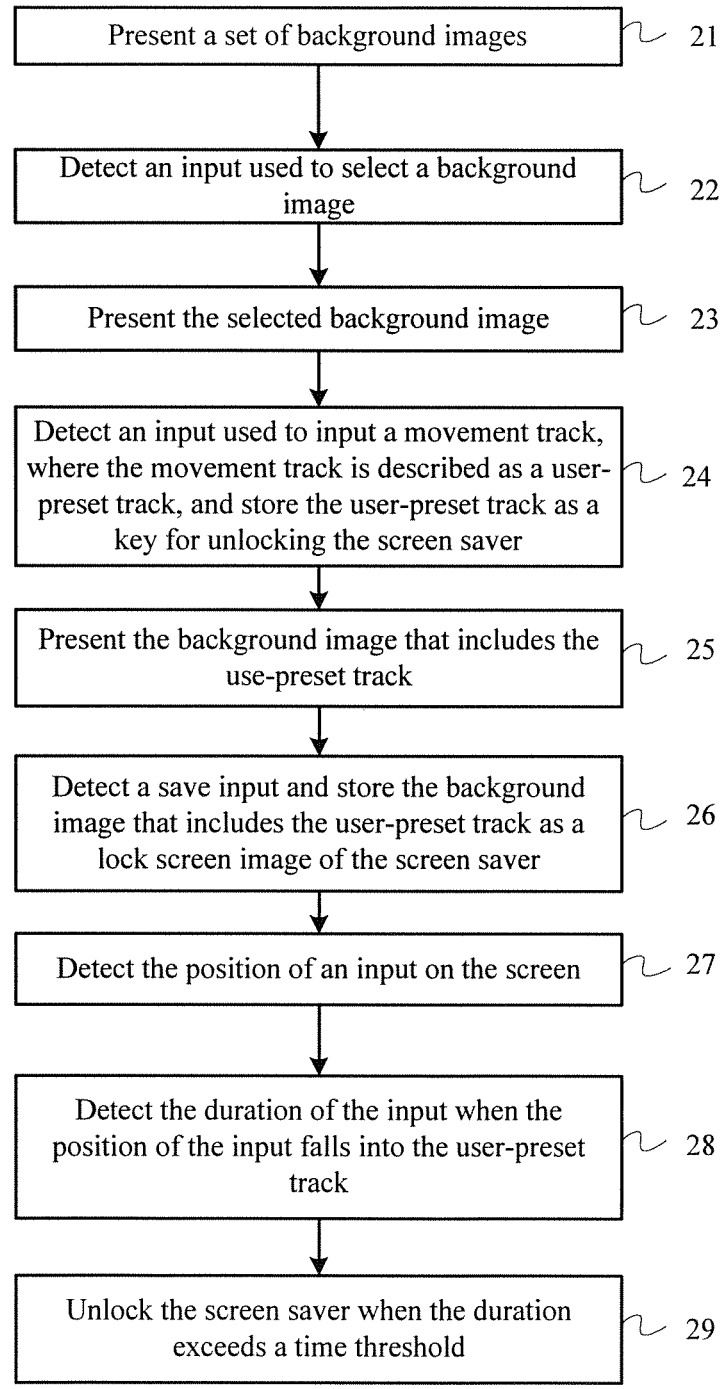
FIG. 2 is a schematic flowchart of a method for unlocking a screen saver according to another embodiment of the present invention.

FIG. 2 is a schematic flowchart of a method 20 for unlocking a screen saver in another embodiment of the present invention. In the following embodiment, a user equipment such as a mobile terminal that includes an interactive touch screen is described as an example to explain the method for unlocking a screen saver, where FIGS. 3A to 3D are schematic diagrams of applications of an embodiment of the present invention. The method 20 including the following content.

21. Present a set of background images.

The user equipment may provide an application function that supports the screen unlocking solution of the embodiment of the present invention. The function may be implemented by a physical module where software that implements the application function is stored or run. Or, the function may be implemented in the form of a software functional module whose installation and running modes are not limited. For example, the software functional module may be embedded in an operating system, or may be installed as independent client software in such a case that the application function can be saved as an icon in the user equipment and the application function is activated or started by a click on the icon.

Figure 3A:
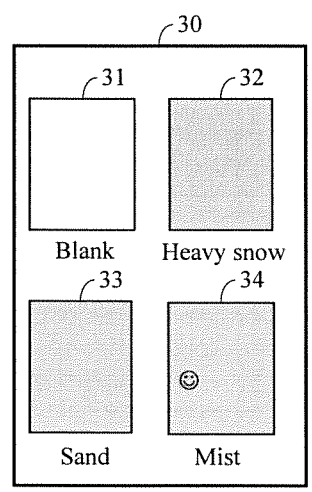
FIGS. 3A-3D are schematic diagrams of an application according to an embodiment of the present invention.
Figure 3B:
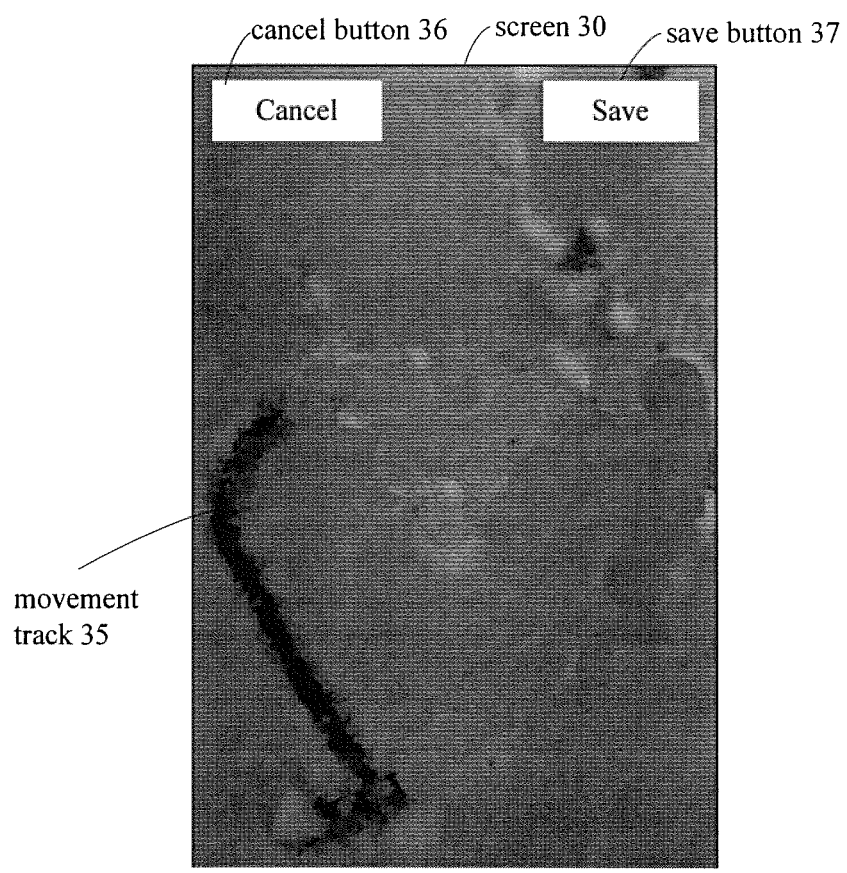

Then, after the application function is activated, as shown in FIG. 3A, a screen 30 presents a schematic set of background images. The set of background images may include a totally blank background image 31 or include background images with content. The content of background images may be, for example, a snow field 32, a sand land 33, or apiece of mist-covered glass 34, or may be any person or scene. In a word, the content of background images is not limited.

22. Detect an input used to select a background image.

The input to select a background image is also described as a third input herein.

23. Present the selected background image.

After the user equipment detects that a user has selected a background image, the screen of the user equipment presents the selected background image.

24. Detect an input used to input a movement track, where the movement track 35 is also described as a user-preset track, and save the user-preset track as a key for unlocking the screen saver.

The user may draw at will on a screen and the drawn track is the movement track of a user input. Reference may be made to the intermediate process shown in FIG. 3B and the final result shown in FIG. 3C. A movement track's input detected by the user equipment is also described as a second input herein. The movement track 35 is also described as a user-preset track herein. Using a user-preset track as a key for unlocking the screen saver may highlight the personality of the user.

In addition, alternatively, the movement track presented on the screen is processed adaptively according to different background images so as to present different processing effects. For example, when the background image is a snow field, the movement track presented on the screen simulates a natural phenomenon where a finger passes by a snow field with the movement of the second input. For example, where the finger passes by, a snow field effect is presented, for example, a snow-covered land is exposed and the snow where the finger passes by is piled up on one side. Alternatively, when the finger passes by the snow field, the user equipment may feed back a rustling sound, so that the simulated natural phenomenon is more real, thereby increasing fun. Accordingly, when there is a mist in a background image, the adaptively processed movement track may present a mist effect after a finger passes by, including the effect of falling water drops where the finger passes by, and alternatively, the user equipment feeds back the sound of water drops falling on the ground. Accordingly, when there is sand in the background image, the adaptively processed movement track may present the effect that the sand where the finger passes by is piled up on one side and the edges of the movement track present a rough sand box effect. Alternatively, the movement track may be presented with different depths according to the input strength of the user.

In addition, in the case of a blank background image, alternatively, the movement track of the user input may be processed, for example, as a fountain-pen written signature, a brush pen work, or an engraved sculpture, and so on.

25. Present the background image that includes the user-preset track.

Figure 3C:
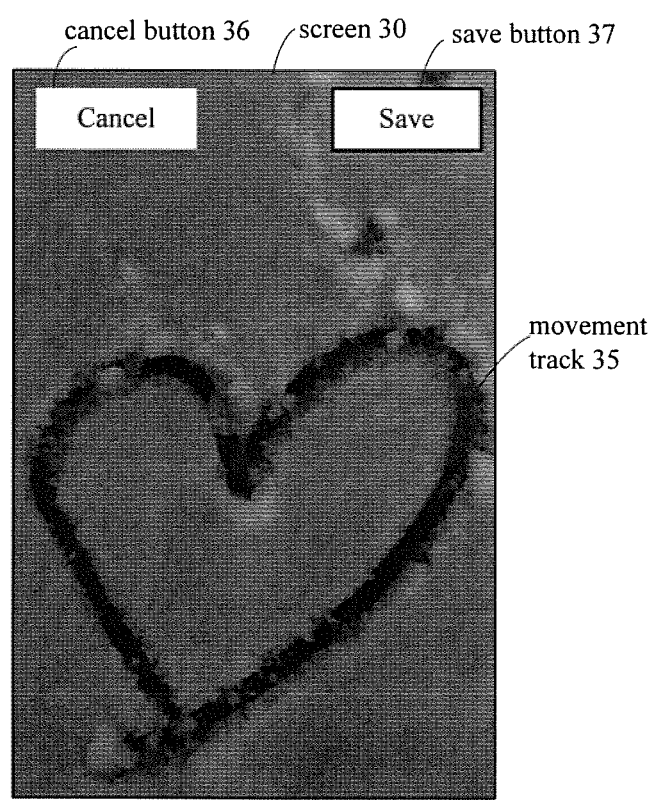

The movement track 35 is presented gradually with the second input of the user. When the second input is complete, the background image that includes the complete movement track is presented, as shown in FIG. 3C. In this case, FIG. 3C may present two buttons simultaneously, where the save button 37 is used to save the background image that includes the movement track as the lock screen image of the screen saver and the cancel button 36 is used to restore the interface that is presented before screen saver, such as the interface upon startup.

26. Detect a save selection input and save the background image that includes the user-preset track as the lock screen image of the screen saver.

The user equipment detects an input used to select the save button 37, which means that the user selects the save button, and the user equipment saves the background image that includes the movement track as the lock screen image of the screen saver. In FIG. 3C, for clear description, the save button 37 is highlighted with black bold effects. In practice, the save button may be implemented in combination with different animation applications. The input used to select the save button is also described as a fourth input herein and the above movement track is described as a user-preset track hereinafter.

Afterwards, after the screen saver is started, a lock screen image is presented on the screen of the user equipment. Alternatively, the user-preset track in the unlock image may be presented or not presented, depending on the user's selection.

As described above, the user-preset track is saved as a key for unlocking the screen saver. When the user-preset track is presented in the unlock image, the user can unlock the screen saver quickly in a subsequent unlocking process. When the presented lock screen image hides the user-preset track, the secrecy of the user equipment can be improved. In this case, the user can unlock the screen saver quickly only when the user learns roughly the user-preset track.

27. Detect the position of an input on the screen.

Figure 3D:
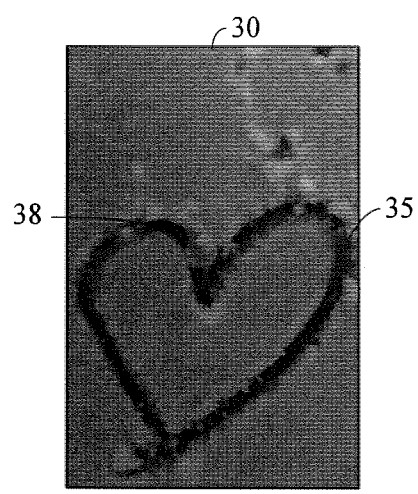

After the screen saver is enabled, the user intends to unlock the screen saver. The user equipment detects an input 38 of the user on the screen, where the input 38 is also described as a first input herein. If the first input does not fall into the user-preset track, the screen saver maintains a locked state. If the input 38 falls into the user-preset track, as shown in FIG. 3D, the next step is executed.

28. Detect the duration of the input when the position of the input falls into the user-preset track.

29. Unlock the screen saver when the duration exceeds a time threshold.

The first input of the user lasts a period of time which exceeds the preset time threshold, and then the screen saver is unlocked. The detecting the first input of the user is equivalent to the effect that the user equipment accepts the key input by the user for unlocking the screen saver. Alternatively, the user-preset track in the lock screen image of the screen saver gradually fades out, which is presented as a dynamic process, until the screen saver is unlocked. Then, no matter whether the user-preset track is presented or is not presented in the current lock screen image, the user-preset track may be displayed. The user-preset track may gradually fade out as a whole, or fade out starting from the position of the first input and extending to other positions. This again reflects the personalized creation of the user and increases fun. Alternatively, the user-preset track in the lock screen image may be presented from the time when the screen saver is enabled to the time when the screen saver is unlocked, thereby keeping consistency of secrecy of the user equipment.

In the embodiment of the present invention, the screen saver may be unlocked when the user presses and holds any point in the user-preset track for a period of time that exceeds a time threshold, without complicated actions such as moving or double-clicking, and especially, for a user equipment that uses an interactive touch screen, it is easy and convenient to perform unlocking.

The embodiment of the present invention may implement personalized operations of screen saver unlocking and increase fun by detecting whether the position of a user input falls into a user-preset track and detecting the duration of the user input.

Figure 4:
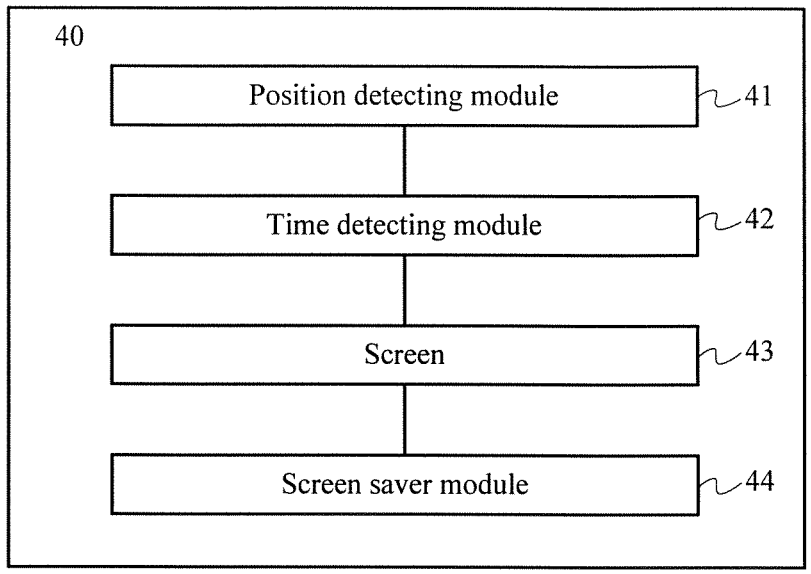
FIG. 4 is a schematic block diagram of a user equipment according to an embodiment of the present invention.

FIG. 4 is a schematic block diagram of a user equipment 40 in an embodiment of the present invention.

The user equipment 40 includes a position detecting module 41, a time detecting module 42, a screen saver module 44, and a screen 43. The screen 43 is a display unit, such as a monitor or a handset screen, of the user equipment 40.

The position detecting module 41 detects the position of a first input on the screen 43.

The time detecting module 42 detects the duration of the first input when the position detecting module 41 detects that the position of the first input falls into a user-preset track.

The screen saver module 44 unlocks a screen saver when the time detecting module 42 detects that the duration exceeds a time threshold.

The user equipment 40 implements the method 10. For brevity, specific details are not provided herein.

The embodiment of the present invention may implement personalized operations of screen saver unlocking and increase fun by detecting whether the position of a user input falls into a user-preset track and detecting the duration of the user input.

Figure 5:
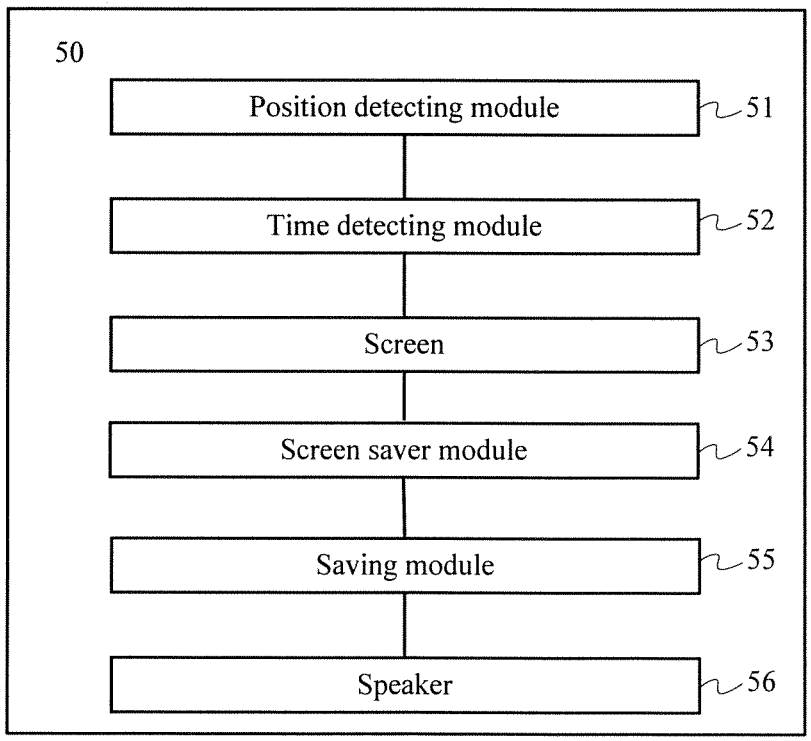
FIG. 5 is a schematic block diagram of another user equipment according to an embodiment of the present invention.

FIG. 5 is a schematic block diagram of another user equipment 50 in an embodiment of the present invention.

A position detecting module 51, time detecting module 52, screen saver module 54, and screen 53 of the user equipment 50 are the same as or similar to the position detecting module 41, time detecting module 42, screen saver module 44, and screen 43 of the user equipment 40.

The position detecting module 51 detects the position of a first input on the screen 53.

The time detecting module 52 detects the duration of the first input when the position detecting module 51 detects that the position of the first input falls into a user-preset track.

The screen saver module 54 unlocks a screen saver when the time detecting module 52 detects that the duration exceeds a time threshold.

The difference between the user equipment 50 and the user equipment 40 lies in that the user equipment 50 further includes a saving module 55 and a speaker 56.

The screen 53 is specifically configured to: when the time detecting module 52 detects that the duration exceeds the time threshold, present the user-preset track, which gradually fades out, in the lock screen image of the screen saver until the screen saver module 54 unlocks the screen saver.

Before the position detecting module 51 is configured to detect the position of the first input on the screen 53, the position detecting module 51 is further configured to detect a second input on the screen, where the second input is used to input a movement track and the movement track of the second input is the user-preset track; the screen 53 is further configured to present the user-preset track; and the screen saver module 54 is configured to save the user-preset track as a key for unlocking the screen saver.

Before the position detecting module 51 is configured to detect the second input on the screen, the position detecting module 51 is further configured to detect a third input that is used to select a background image; the screen 53 is further configured to present the selected background image; and the screen 53 is specifically configured to present a background image that includes the user-preset track, the screen saver module 54 saves the user-preset track as the key for unlocking the screen saver, and the saving module 55 is specifically configured to save the background image that includes the user-preset track as a lock screen image of the screen saver.

The screen 53 is further configured to present the background image that includes the user-preset track, and a save button and a cancel button, where the save button is used to save the background image that includes the user-preset track as a lock screen image of the screen saver and the cancel button is used to restore the interface that is presented before the third input.

The position detecting module 51 is specifically further configured to detect a fourth input that is used to select the save button, and the saving module 55 is specifically configured to save, according to the fourth input, the background image that includes the user-preset track as a lock screen image of the screen saver.

The speaker 56 is configured to feed back a sound when the user-preset track is presented.

The screen 53 is specifically configured to present, according to different background images, a background image that includes the user-preset track and has different processing effects, where the background image includes multiple display elements that simulate the accumulative effects of fine grains in a real world, where the accumulative effects of fine grains include a sand box effect, a snow field effect, or a mist effect.

When the screen 53 is further configured to, after the screen saver module enables the screen saver, present the lock screen image, the screen is configured to present or not to present the user-preset track in the lock screen image.

The screen 53 may be an interactive touch screen.

The user equipment 50 implements the method 10 and the method 20. For brevity, specific details are not provided herein.

The embodiment of the present invention may implement personalized operations of screen saver unlocking and increase fun by detecting whether the position of a user input falls into a user-preset track and detecting the duration of the user input.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions of the embodiments.

In addition, functional units in each embodiment of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or part of the steps of the method described in the embodiment of the present invention. The storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing description is merely about the specific implementation of the present invention, but is not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the appended claims.

What is claimed is:

1. A method for unlocking a screen saver, the method comprising:
   detecting a first input that is used to select a background image; and
   presenting the selected background image;
   detecting a second input second input is used to input a user-preset track;
   presenting the user-preset track;
   saving the user-preset track as a key for unlocking the screen saver, including presenting a changing background image that comprises the user-preset track and saving the background image that comprises the user-preset track as a lock screen image of the screen saver;
   detecting a position of a third input on the screen;
   detecting a duration of the third input when the position of the third input falls into the user-preset track; and
   unlocking the screen saver when the duration exceeds a time threshold.

2. The method according to claim 1, wherein the user-preset track has the appearance of a track formed in a plurality of fine grains in a natural scene.

3. The method according to claim 1, wherein presenting the changing background image that comprises the user-preset track comprises:
  presenting the background image that comprises the user-preset track, and a save button and a cancel button, wherein the save button is used to save the background image that comprises the user-preset track as the lock screen image of the screen saver and the cancel button is used to restore an interface that is presented before the first input; and
  wherein saving the background image that comprises the user-preset track as the lock screen image of the screen saver comprises:
  detecting a fourth input that is used to select the save button and saving the background image that comprises the user-preset track as the lock screen image of the screen saver.

4. The method according to claim 1, wherein when presenting the user-preset track, the method further comprises:
  feeding back a sound.

5. The method according to claim 1, wherein presenting the changing background image that comprises the user-preset track comprises:
  presenting the background image that includes the user-preset track and has different processing effects, wherein the background image comprises multiple display elements that simulate accumulative effects of fine grains in a real world, wherein the accumulative effects of fine grains comprise a sand box effect, a snow field effect, or a mist effect.

6. The method according to claim 1, wherein the lock screen image of the screen saver is displayed after the screen saver is enabled.

7. A user equipment, comprising:
  a screen;
  a screen saving module; and
  at least one processor configured to:
    detect a first input which is used to select a background image;
    detect a second input on the screen, wherein the second input is used to input a user-preset track, and to save the user-preset track as a key for unlocking the screen saver;
    detect a position of a third input on the screen;
    detect a duration of the third input when the position of the third input falls into the user-preset track; and
    unlock a screen saver when the duration exceeds a time threshold,
  wherein the screen is configured to:
    present the user-preset track;
    present the selected background image; and
    when the at least one processor detects the second input, present a changing background image that comprises the user-preset track,
  wherein the screen saver module is configured to save the user-preset track as the key for unlocking the screen saver, and to save the background image that comprises the user-preset track as a lock screen image of the screen saver.

8. The user equipment according to claim 7, wherein the user-preset track has the appearance of a track formed in a plurality of fine grains in a natural scene.

9. The user equipment according to claim 7, wherein:
  the screen is further configured to present the changing background image that comprises the user-preset track, and a save button and a cancel button, wherein the save button is used to save the background image that comprises the user-preset track as the lock screen image of the screen saver and the cancel button is used to restore an interface that is presented before the first input; and
  the at least one processor is further configured to detect a fourth input that is used to select the save button, and to save, according to the fourth input, the background image that comprises the user-preset track as the lock screen image of the screen saver.

10. The user equipment according to claim 9, further comprising a speaker, wherein:
  the speaker is configured to feed back an adaptive sound when the user-preset track is presented.

11. The user equipment according to claim 9, wherein:
  the screen is configured to present, according to different background images, the changing background image that includes the user-preset track and has different processing effects.

12. The user equipment according to claim 7, further comprising a speaker configured to feed back an adaptive sound when the user-preset track is presented.

13. The user equipment according to claim 7, wherein:
  the screen is configured to present, according to different background images, the changing background image that includes the user-preset track and has different processing effects.

14. The user equipment according to claim 7, wherein:
  the lock screen image of the screen saver is displayed after the at least one processor enables the screen saver.

15. The user equipment according to claim 7, wherein:
  the screen is an interactive touch screen.

* * * * *